Figure 1:
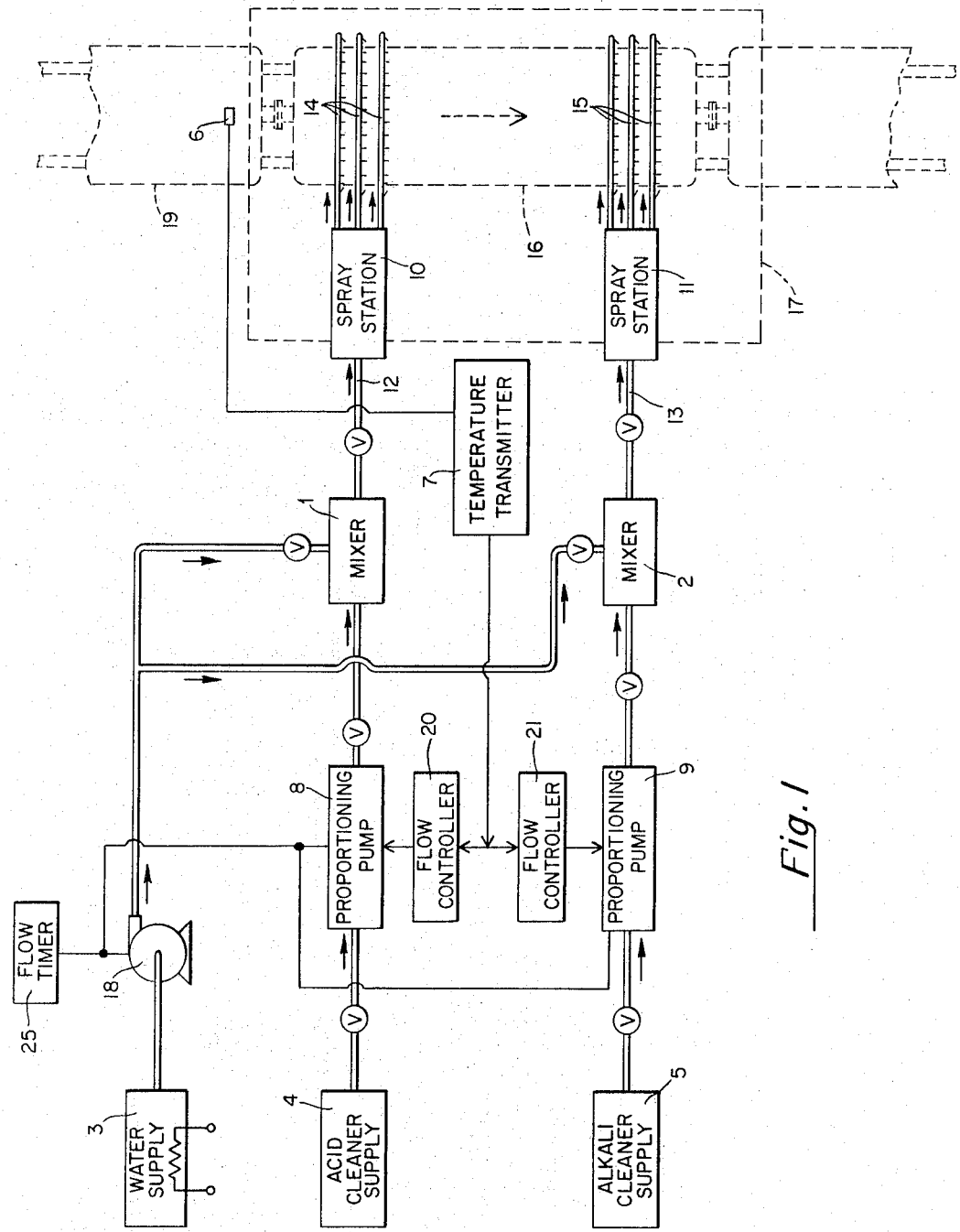

March 7, 1967  R. M. BURFORD  3,307,744
METHOD AND APPARATUS FOR AUTOMATIC CONTROL OF CLEANING
SOLUTION CONCENTRATIONS IN VEHICLE WASHING SYSTEM
Filed Oct. 18, 1965  2 Sheets-Sheet 2

INVENTOR.
ROBERT M. BURFORD
BY Emil W. Milan
ATTORNEY

United States Patent Office 3,307,744
Patented Mar. 7, 1967

3,307,744
METHOD AND APPARATUS FOR AUTOMATIC CONTROL OF CLEANING SOLUTION CONCENTRATIONS IN VEHICLE WASHING SYSTEM
Robert M. Burford, Malvern, Pa., assignor to Pennsalt Chemicals Corporation, Philadelphia, Pa., a corporation of Pennsylvania
Filed Oct. 18, 1965, Ser. No. 496,824
17 Claims. (Cl. 222—1)

This invention relates to improvements in the adjustment and control of concentrations of cleaning solutions used in automatic washing of vehicles such as railway engines, railway cars, highway trucks and trailers, buses and passenger cars and other vehicles subject to surface soils.

More particularly, the invention relates to a method and apparatus for continuously keeping the concentrations of the cleaning solutions used at optimum concentrations relative to the temperature of the surface of the vehicle being cleaned.

The cleaning of large-sized vehicles used in highway and railway operations is carried out continuously around-the-clock in many types of cleaning stations. The vehicles are brought into the station under a variety of atmospheric conditions. Thus, a railway car may have been sitting in the hot summer sun for several hours, attaining a surface temperature of 100° F. or higher before entering the cleaning station. The cleaning solutions which are applied to the surface of the body and undercarriage of the car usually are provided at set concentrations for average temperature conditions and normally efficient cleaning results then are obtained. However, later in the same 24-hour period the atmospheric conditions usually change from hot to cool, and the surface temperatures of succeeding cars may be as much as 40° F. or more below that of the cars cleaned earlier in the heat of the day. The cleaning solutions then are not sufficiently concentrated to do as effective a cleaning operation on the cooler surface as the solutions were able to do on the hot surface. Since the cleaning solutions normally are made up to standard specifications, the cleaning operation then must either be prolonged, or hand or machine scrubbing must be resorted to in order to achieve the same degree of cleaning as was obtained at the higher temperature. The daily temperature fluctuations are particularly significant in the spring and fall, especially where around-the-clock cleaning operations are carried out. Thus, it is possible in some elevated geographical areas for the temperature to plunge from a high of about 100° F. during the day to near to freezing during the night. A temperature change of such magnitude seriously affects the efficiency of the cleaning solutions being used if the concentrations are kept constant. Also, if the concentration of the cleaning solutions is kept high at the level necessary to achieve effective cleaning at a low temperature, a considerable waste of cleaning solution occurs when the same strength solutions are used at high temperatures.

It is an object of the present invention to provide a method and apparatus whereby the concentrations of all the cleaning solutions used will be automatically adjusted reciprocally in such a manner that when the temperature of the surface of a vehicle which is to be cleaned rises relative to that of a preceding vehicle, the concentrations of all the cleaning solutions automatically will be decreased; and when the temperature falls, the concentrations of all the cleaning solutions automatically will be increased, thereby to maintain each cleaning solution at a concentration determined to be optimumly effective at the new temperature. Other objects and advantages of this invention, together with certain details, instructions and combinations of equipment will appear from the following detailed description and will particularly be pointed out in the appended claims.

Figure 3:
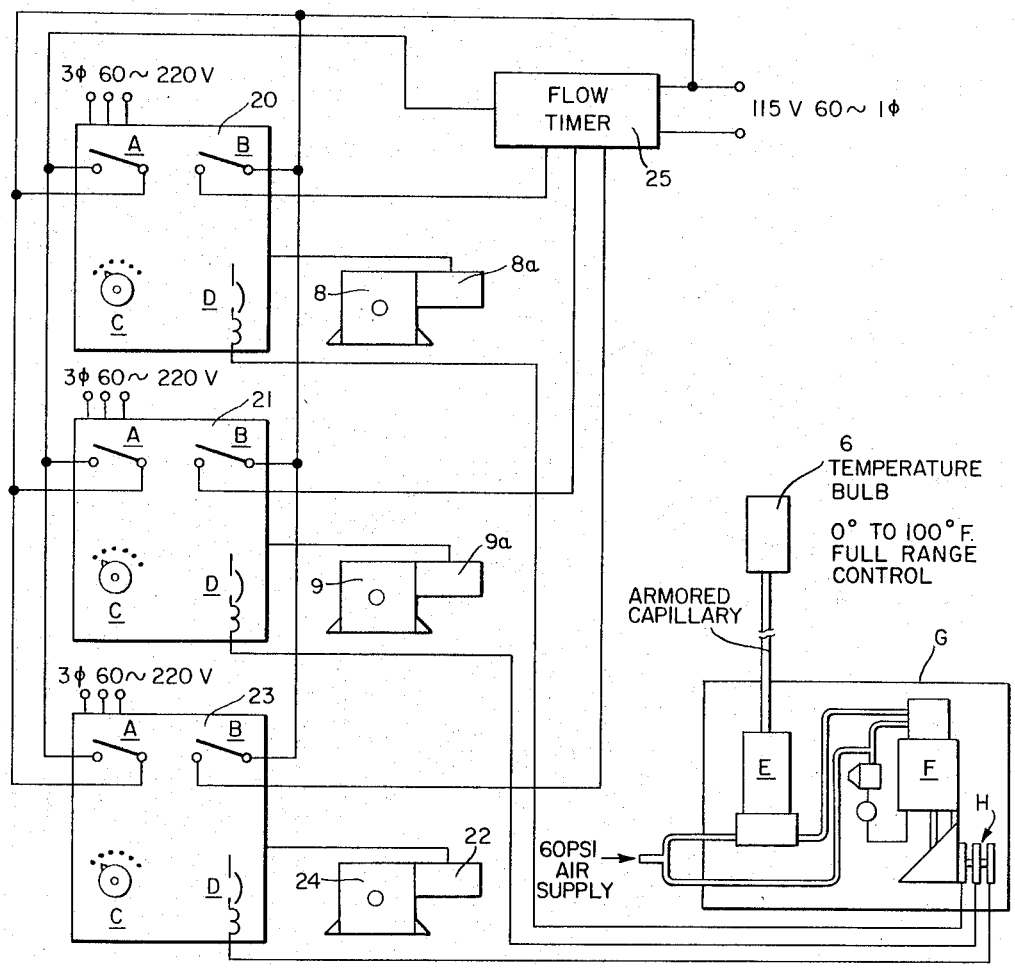
Figure 2:
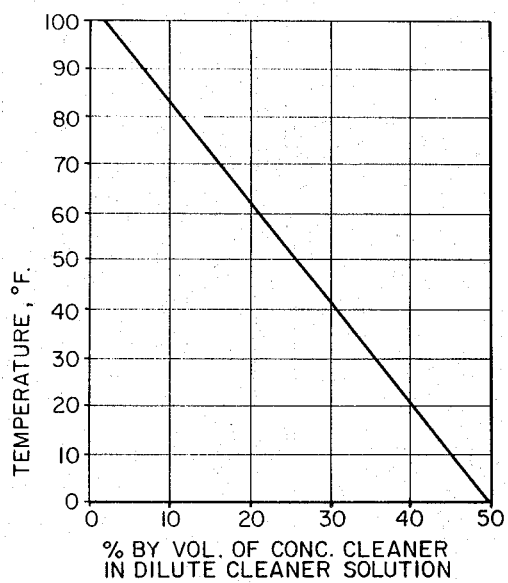

In the drawings, FIG. 1 is a schematic diagram illustrating one preferred embodiment of the method and an apparatus arrangement of the present invention, using only one acid cleaner solution spraying station and only one alkali cleaner solution spraying station; FIG. 2 is a chart showing an exemplary reciprocal correlation of temperatures v. percent by volume of concentrated cleaner in dilute cleaner solution; and FIG. 3 is a schematic diagram illustrating one preferred embodiment of control apparatus used in the present invention.

Referring first to FIG. 1, the invention is illustrated in connection with a single acid cleaner solution spray station 10 and a single alkali cleaner solution spray station 11 used to clean a tankcar 16 as it moves continuously through a cleaning station 17. It will be understood that in an actual cleaning system a plurality of such acid and alkali cleaner solution spray stations and cleaning stations may be employed. In FIG. 1, conduits or pipes for supply of water, acid and alkali cleaning solutions and mixtures of the solutions with water are shown by double lines, whereas single lines are employed to ilustrate air tubes or electrical lines communicating with the various instruments shown. The various sensor and control instruments and pieces of apparatus are illustrated in schematic or block form since they constitute well-known instruments and mechanisms, the details of which form no particular part of the present invention.

The basic principle of the present invention involves a measurement of the temperature of the surface of a vehicle entering the cleaning station 17. The temperature measurement is signalled to a temperature transmitter which actuates control means for the flows of acid and alkali cleaner solutions in concentrated forms through metering and control devices reciprocally responsive to signals from the temperature sensor and temperature transmitter. The concentrated acid and alkali cleaner solutions flow individually into separate mixers where they are mixed with water maintained at a substantially constant temperature and pressure and are diluted to use concentrations.

The flow controllers are designed to cause pumps or valves to supply concentrated cleaner solutions at amounts reciprocal to the temperature signal received from the temperature sensor and temperature transmitter and to maintain the ratio of cleaning agent to water at the automatically set ratio regardless of flow rate. Thus, at a high temperature signal e.g., 90° F., from the temperature sensor, the flow controllers will cause low feed rates of concentrated cleaner solutions to move to the respective mixers. Conversely at a low temperature signal, e.g., 20° F., the flow controllers will cause high feed rates of cleaner solutions to move to the respective mixers.

Various instruments of well-known types may be employed for measuring the temperature of the surface of the vehicle to be cleaned. Since the temperature of the surface of the vehicle will usually be established by the ambient temperature of the atmosphere surrounding the vehicle, it is preferred to use a gas- or liquid-filled pressure expansion thermometer of the industrial type. arranged to measure the temperature of the atmosphere immediately adjacent to the vehicle surface. A gas-filled pressure thermometer associated with a Borden tube element which is associated with mechanical or electrical signal transmitting means is preferred. However, it is to be understood that other types of temperature sensing means such as thermocouples, resistance thermometers, radiation pyrometers, as well as electric measuring instruments such as potentiometers, can be used directly on or adjacent to the surface of the vehicle whose temperature is to be measured.

In FIG. 1 the temperature sensor 6 relays the ambient temperature of the surface of the incoming tankcar 19 to a temperature transmitter 7. Since the tankcars usually are moving continuously through the cleaning station 17, the surface temperature of tank cars 16 and 19 are not significantly different; accordingly for purposes of practicing the invention, measuring the temperature of the surface of the incoming tankcar is equivalent to measuring the surface temperature of the tankcar being cleaned. The temperature transmitter 7 relays a signal which passes both to a concentrated acid cleaner flow controller 20 associated with acid cleaner proportioning pump 8 and to concentrated alkali cleaner flow controller 21 associated with alkali cleaner proportioning pump 9; pump 8 is actuated by flow timer 25 substantially simultaneously with water pump 18. A temperature transmitter 7 and flow controllers 20 and 21 as further described in FIG. 3 are preferably used. Acid cleaner proportioning pump 8 receives a supply of acid cleaner solution in concentrated form from acid cleaner supply tank 4 and pumps the concentrated acid cleaner solution at a sufficiently high pressure to overcome back pressure in the mixer into an acid cleaner-water mixer 1 where the acid cleaner is mixed with water (heated if desired) continuously supplied from water supply tank 3 through water pump 18 at a constant pressure, e.g., 100 p.s.i.g., which is actuated by flow timer 25 when a tankcar enters cleaning station 17. The temperature of the water in supply tank 3 preferably is maintained at a temperature between 70° and 120° F. by a thermostatically controlled heater; however, water at ambient temperature can be used. Preferably the temperature is maintained at about 80° F. during the summer and at about 140° F. in the winter. The temperature of the water need be only sufficiently elevated to compensate for any unusual temperature of the surface of the vehicle to be cleaned, especially in cold weather. Concentrated alkali cleaner solution flows, at a sufficiently high pressure, from alkali cleaner supply tank 5 through alkali cleaner proportioning pump 9, which is actuated by flow timer 25 when the front end of the tank car enters spray station 11, and is mixed in an alkali cleaner-water mixer 2 with water coming from supply tank 3 through pump 18. The diluted acid cleaner solution passes through line 12 to acid cleaner solution spray station 10 where it is discharged through spray nozzles 14 onto the surface of the tankcar 16 as the vehicle enters the cleaning station 17. As tankcar 16 moves through cleaning station 17 away from acid cleaner solution spray station 10 and into the area of alkali cleaner solution spray station 11, the diluted alkali cleaner solution spray is applied through alkali cleaner spray nozzles 15 to the surface of the tankcar. The amount of alkali cleaner spray used is such that residual acid cleaner spray left on the surface is substantially neutralized as it passes through spray station 11. The rates of application of the sprays and the duration of the sprays to provide adequate cleaning are controlled by known procedures not shown and not part of this invention. The cleaned tankcar 16 passes out of cleaning station 17 and then moves to any subsequent rinsing or waxing stations, if used.

In FIG. 2 is shown a chart which demonstrates the relative reciprocal correlation between temperatures and percent by volume of a typical concentrated cleaner, containing 10% by weight of active cleaning agent in the concentrate, in the diluted cleaner solution used in the embodiment of the invention shown in FIG. 1. It should be noted that the percentage by volume is intended to mean the percent by volume of the original concentrated cleaner, also referred to herein as concentrate, relative to the total volume of diluted cleaner solution. The concentrate may contain any amount by weight of cleaning agent up to saturation to form a solution of aqueous acid cleaner. When 5 gallons of the concentrated aqueous acid cleaner, or acid cleaner concentrate, are mixed with 15 gallons of water, the percentage by volume of the concentrate in the dilute cleaner solution will be 25%. In practice, one volume of the above exemplary concentrate is automatically diluted with from 51 to 98 volumes of water for use. From the chart, it will be seen that at a low temperature, such as 40° F., dilute cleaner solution containing about 30% by volume of the concentrate will be required, whereas at a temperature of about 85° F. a dilute cleaner solution containing 10% by volume of concentrate will be adequate.

FIG. 3 is a preferred control and wiring diagram for an embodiment of the invention using one acid cleaner solution spray station and two alkali cleaner solution spray stations. In FIG. 3, the bulb of the temperature sensor 6 is shown connected to temperature transmitter 7, which consists of an air balanced expansion chamber E, a pneumatic-electric transducer F, and three rheostats H, all mounted on a support plate G. The temperature sensor 6 and chamber E which are used in this embodiment are a combined unit, Moore Nullmatic No. 33–D 5012 (Moore Products, Philadelphia, Pa.). The transducer is a Conoflow Pneumatic Current Controller Model No. EB–51, with which are associated the rheostats H. The elements E and F of temperature transmitter 7 are actuated by a suitable, e.g., 60 p.s.i., air supply. The temperature transmitter mechanically operates and positions the rheostats H, which together with appropriate connectors and switches comprise acid cleaner flow controller 20, alkali cleaner flow controller 21 and a second alkali cleaner flow controller 23. Each of controllers 20, 21 and 23 comprises (a) one of the rheostats H, and (b) a power switch A, a drive-start-stop switch B, a rheostat trim control C, and a circuit breaker D, such as are provided as a unit, for example, by Polyspeed Corporation, Houston, Texas, as Model SCH2 Control. A signal from acid cleaner flow controller 20 passes in the form of electrical energy to variable speed motor 8a which is directly connected to proportioning pump 8. Similarly, a signal from alkali cleaner flow controller 21 is conducted electrically to variable speed motor 9a connected directly to proportioning pump 9. Likewise, a signal from alkali cleaner flow controller 23 is conducted electrically to variable speed motor 22 connected directly to proportioning pump 24. Drive-start-stop switch B of each of the controllers is connected to flow timer 25 which can be set to control the duration of pumping of the various concentrated cleaning solutions from pumps 8, 9 and 24 to the respective mixers as shown in FIG. 1. However, the rates at which pumps 8, 9 and 24 deliver concentrated cleaning agents to their respective mixers is controlled automatically and continuously by the temperature sensed by the bulb of temperature sensor 6 and relayed as a signal through temperature transmitter 7 and the controllers.

Operation of the control system at an outdoors cleaning station 17 during a typical 24-hour period is about as follows. Assuming that operations at the cleaning station 17 are begun at 8 a.m. when the ambient temperature of the surface of the vehicle, e.g., a locomotive or a tankcar, to be cleaned is at 60° F. as measured by the bulb of temperature sensor 6 which is placed immediately adjacent to the surface of the incoming vehicle. Referring to the chart shown in FIG. 2, it is seen that at a temperature of 60° F. the optimum diluted cleaner solutions should contain 25% by volume of concentrates. The flow control units 20, 21, and 23 are set initially by hand by adjusting the rheostat trim controls C to regulate the speeds of variable drive motors 8a, 9a, and 24a to deliver concentrated cleaner solutions by pumps 8, 9 and 24 respectively at rates such that when each solution is mixed in the ratio of 1 volume of concentrate to 3 volumes of water a 25% by volume solution of dilute cleaner solution will result. Setting of a particular rheostat trim control C controls the rate at which the variable speed motor which it controls will operate to drive the pump to which the motor is connected. This setting serves as a zero point setting from which the rate is varied as required by signals from the rheostat H. The flow timer 25 is actuated by a light beam, not shown, as the front of the first tankcar in cleaning station 17 passes into the entrance to acid spray station 10. Water pump 18 is actuated by flow timer 25, and substantially simultaneously switch B of acid flow controller 20 is actuated, starting motor 8a on pump 8. Concentrated acid cleaner solution from acid cleaner supply tank 4 is pumped by pump 8 into acid cleaner-water mixer 1 where it is mixed and diluted with water from water supply tank 3. The dilute acid cleaner solution passes through line 12 to acid cleaner solution spray station 10 and is sprayed through spray nozzles 14 onto the surface of vehicle 16, cleaning it. As the front of vehicle 16 is moved, by a drive not shown, into position toward the entrance to alkali cleaner solution spray station 11, the flow timer 25 connected to switch B of alkali cleaner flow controller 21 actuates switch B, and in turn, variable speed motor 9a to drive pump 9. Alkali cleaner in concentrated solution form passes from tank 5 through pump 9 into the alkali cleaner-water mixer 2 where it is diluted with water from water supply tank 3, and is delivered to alkali cleaner spray station 11 and sprayed through alkali cleaner solution spray nozzles 15 onto the surface of vehicle 16, neutralizing the acid cleaner solution left on the surface from the acid cleaning step. In the event that a second alkali cleaner spray is used, as shown in the embodiment of FIG. 3, the second alkali cleaner solution spray station will be similarly actuated and controlled.

As the ambient outdoors temperature rises during the day and the surface temperature of the vehicles correspondingly rises, the rise in temperature will be sensed by the bulb of temperature sensor 6, which in turn will actuate temperature transmitter 7 to cause flow controllers 20 and 21 to decrease the flows of concentrated cleaner solutions through pumps 8 and 9 (assuming that only pumps 8 and 9 are being used, as shown in FIG. 1). Assuming that by 4 p.m. the ambient temperature has risen to 90° F., the volumes of concentrates in the dilute cleaner solutions will need to be only 10% by volume, as compared to 25% earlier in the day. The temperature transmitter 7 will have automatically and gradually during the day caused adjustment of the flow of electrical current through flow controllers 20 and 21 to the variable speed motors 8a and 9a so that the ratio of concentrated acid cleaner or concentrated alkali cleaner being pumped through the respective pumps is reduced to 1 volume of acid cleaner concentrate to 9 volumes of water and 1 volume of alkali cleaner concentrate to 9 volumes of water, making the respective diluted cleaner solutions about 10% solutions by volume of original concentrate.

Assuming that by 3 a.m. the ambient temperature of the surface of the incoming vehicle has dropped to 40° F. then the flows of acid and alkali cleaner concentrates will have been automatically increased as the temperature fell to provide dilute cleaner solutions containing 30% by volume of concentrates, as indicated by the table in FIG. 2.

Although the invention has been described with reference to specific preferred embodiments thereof, it is to be understood that various modifications and alternatives may be resorted to without departing from the scope of the invention as defined in the appended claims. For example, in place of proportiong the concentrated cleaners to the water to make dilute cleaner solutions by means of proportioning pumps, automatic variable control valves can be used with appropriate flow control means actuated by the pneumatic-electric transducer F of FIG. 3. Also, while mixers are provided in the embodiments of FIG. 1 for mixing the concentrated cleaners with the water, the mixing may be done directly in pipelines through which the water is flowing and the cleaners in concentrated form are directly metered. The turbulence in the pipes, as well as the mixing action provided by the spray nozzles, will serve to sufficiently mix the cleaners with the water by the time they strike the surface of the vehicle in the cleaning station 17.

The term acid cleaner as used in this invention is meant to include aqueous solutions of acids and acid salts such as are commonly used for industrial cleaning purposes of the type of vehicles described herein, e.g., corrosion inhibited $HCl$, $H_2SO_4$, $HNO_3$, $HF$, $H_3PO_4$, and acid salts thereof. Similarly, the term alkali cleaner as used in this invention is intended to include aqueous solutions of alkalis and alkaline salts, such as caustic soda, caustic potash and various alkali metal phosphates, and alkali and alkaline metal cleaner compositions based on such basic ingredients. Synthetic organic detergents can, of course, also advantageously be present in both the acid and alkali cleaner concentrates.

By means of the controls provided by the invention, the volumes of concentrates in the dilute solutions of cleaners at the use points advantageously can be varied from as low as 2% to as high as 50% to provide effective cleaning at surface temperatures ranging between about 20° and 160° F. It will be clear to one skilled in the art that cleaners in solid form can be introduced directly into the water and diluted to form diluted cleaner solutions within the scope and spirit of this invention and it is intended to protect such embodiments in the appended claims.

I claim:

1. In a multi-stage, spray-type system for washing the exteriors of a plurality of vehicles as they pass in succession through a cleaning apparatus having a series of spray stations including at least one acid cleaner solution spray station and at least one following alkali cleaner solution spray station and wherein the temperature of the exterior surfaces of said vehicles entering said system at the beginning of the washing operation is substantially the same as the ambient temperature in the approach area to the entrance of said apparatus, said temperature being subject to substantial variation during a continuous 24-hour period, the method of continuously supplying the respective cleaner in each said solution to each said station at a predetermined dilution effective for achieving the desired cleaning of the surface at the respective station at said temperature and of continuously adjusting the supply of the cleaner in each solution reciprocally to the change of said ambient temperature to a new ambient temperature to provide adjusted solutions containing the cleaners at new predetermined dilutions effective for achieving the desired cleaning at the respective stations at said new temperature, which method comprises (a) automatically, continuously and individually mixing a stream of water with an amount of each respective cleaner in concentrated form sufficient to form a stream of diluted cleaner solution effective for cleaning the exterior of the vehicle at a measured starting vehicle surface temperature, (b) maintaining each said stream of said diluted cleaner solution at a substantially constant temperature and pressure, (c) continuously measuring the temperature of the surface of an incoming vehicle and thereby automatically determining the amount of each respective concentrated cleaning agent to mix with its respective amount of water to provide a predetermined amount of each said cleaning agent in each said diluted cleaner solution, and when said temperature changes from that of the preceding vehicle to a new temperature automatically changing the concentration of each said cleaning agent in each said diluted cleaner solution by (1) when the temperature rises, automatically decreasing by a predetermined amount the amount of concentrated cleaning agent being added and (2) when the temperature falls, automatically increasing by a predetermined amount the amount of concentrated cleaning agent being added, thereby maintaining each respective diluted cleaner solution at a desired effective concentration predetermined for the new temperature.

2. The process according to claim 1 wherein the vehicles are railway vehicles.

3. The process according to claim 1 wherein the vehicles are highway vehicles.

4. The process according to claim 1 wherein the temperature of the surface of the vehicles ranges between about 20° to about 160° F.

5. The method according to claim 1 wherein the temperature of the stream of diluted cleaner solution is maintained in the range between about 80° and about 140° F.

6. The method according to claim 1 wherein the amount of the concentrated acid cleaner is in the range between about 2% and about 50% by volume of diluted cleaner solution at a diluted cleaner solution temperature in the range between about 35° and about 100° F.

7. The method according to claim 1 wherein the amount of the concentrated alkali cleaner is in the range between about 2% and about 50% by volume of diluted cleaner solution at a diluted cleaner solution temperature in the range between about freezing and about 100° F.

8. The method according to claim 6 wherein the temperature of the surface of the vehicles ranges between about 20° and about 160° F.

9. The method according to claim 7 wherein the temperature of the surface of the vehicles ranges between 20° and about 160° F.

10. In a spray-type process for washing the exteriors of a series of individual vehicles as each vehicle passes through an apparatus having at least one cleaner solution spray station wherein the vehicle is subjected to the washing action of at least one stream of an aqueous solution of a cleaning agent and wherein the temperature of the surface of the vehicle at the beginning of the washing action is substantially the same as the ambient temperature in the approach area to said apparatus, said temperature being subject to substantial variation during a continuous 24-hour period, the method of continuously supplying the cleaning agent in the solution at a predetermined dilution effective for achieving cleaning of the surface at said temperature and of continuously adjusting reciprocally the supply of said cleaning agent in said solution in keeping with change of said ambient temperature to a new ambient temperature to provide an adjusted diluted cleaner solution containing said cleaning agent at a new predetermined diluted concentration effective for achieving cleaning of the surface at said new temperature, which method comprises (a) automatically and continuously mixing a stream of water with an amount of concentrated cleaning agent sufficient to form a stream of diluted cleaner solution effective for cleaning the exterior of the vehicle at a measured starting vehicle surface temperature, (b) maintaining said stream of diluted cleaner solution at a substantially constant temperature and pressure.

(c) continuously measuring the temperature of the surface of an incoming vehicle and thereby automatically determining the amount of concentrated cleaning agent to mix with the stream of water to form said diluted cleaner solution, and when said temperature changes from that of the preceding vehicle to a new temperature automatically changing the concentration of cleaning agent in the diluted cleaner solution by (1) when the temperature rises, automatically decreasing by a predetermined amount the amount of concentrated cleaning agent being added and (2) when the temperature falls, automatically increasing by a predetermined amount the amount of concentrated cleaning agent being added, thereby maintaining the diluted cleaner solution at a desired effective concentration predetermined for the new temperature.

11. In a vehicle washing station comprising nozzle means for washing the exteriors of a series of individual vehicles as each vehicle passes through the station whereby at least one stream of an aqueous cleaning solution is applied continuously to the exterior surface of a vehicle in cleaning position at said station and wherein the initial temperature of the exterior surface of the vehicle on entering said washing station at the start of the cleaning action is substantially the same as that of the ambient outdoors temperature, said temperature being subject to substantial variation during a continuous 24-hour period, means for continuously maintaining the concentration of cleaning agent in said solution at a predetermined dilution effective for achieving cleaning of the surface at said temperature and for continuously reciprocally adjusting the concentration of said cleaning agent in said solution in keeping with change of the temperature of the exterior surface of an incoming vehicle from said initial temperature to a new temperature to provide a solution containing said cleaning agent at a predetermined concentration for achieving effective cleaning of the surface at said new temperature, which means comprises (a) mixer means for continuously mixing a major amount of water with a minor amount of concentrated cleaning agent sufficient to form a stream of diluted cleaner solution effective for cleaning the exterior of the vehicle at a predetermined vehicle surface temperature, (b) means for supplying water at a substantially constant temperature and pressure in a continuous stream from a supply source to said mixer, (c) means for supplying concentrated cleaning agent in a continuous stream from a supply source to said mixer, (d) temperature measuring means for continuously determining the temperature of the exterior surface of the vehicle, (e) temperature transmitter means associated with said temperature measuring means and continuously responsive to a signal from said temperature measuring means, (f) flow control means associated with said temperature transmitter means and continuously responsive reciprocally thereto for regulating the flow of said concentrated cleaning agent to said mixer means, (g) and means for delivering said diluted cleaner solution to said nozzle means, said temperature measuring means, temperature transmitter means and flow control means cooperating to continuously measure said temperature and thereby to automatically determine the amount of concentrated cleaning agent to mix with the water to form said diluted cleaner solution and when said temperature changes to a new temperature to automatically change the concentration of cleaning agent in the diluted cleaner solution by (1) when the temperature rises, automatically decreasing the amount of concentrated cleaning agent being added and (2) when the temperature falls, automatically increasing the amount of concentrated cleaning agent being added, thereby maintaining the diluted cleaner solution at a desired effective concentration predetermined for the new temperature.

12. The vehicle washing station according to claim 11 wherein the vehicle is a railway car.

13. The vehicle washing station according to claim 11 wherein the flow control means for a liquid concentrated cleaning agent comprises a variable speed motor and a proportioning pump.

14. The vehicle washing station according to claim 11 wherein the flow control means for a liquid concentrated cleaning agent comprises an automatically variable control valve.

15. In a multi-stage, spray-type cleaning apparatus for washing the exteriors of a plurality of railway cars, including engines, as they pass in succession through said apparatus and having a series of cleaner solution spray stations therein including at least one acid cleaner solution spray station and at least one following alkali cleaner solution spray station and wherein the temperature of the exterior surfaces of said cars entering said station at the beginning of the washing operation is substantially the same as the ambient outdoors temperature, said temperature being subject to substantial variation during a continuous 24-hour period, means for continuously maintaining the concentration of cleaning agent in each individual cleaner solution at a predetermined dilution effective for achieving cleaning of the surface at said temperature and for continuously adjusting the concentration of each individual cleaner solution in response to change of said ambient temperature to a new temperature to provide adjusted cleaner solutions containing the agents at new predetermined dilutions effective for achieving the desired cleaning at the respective spray stations at said new temperature, which means comprises, (a) a plurality of individual mixer means, each being adapted for continuously mixing a major amount with a minor amount of concentrated cleaning agent sufficient to form a stream of diluted cleaner solution effective for cleaning the surface of the car at a predetermined car surface temperature, (b) means for supplying water at a substantially constant temperature and pressure in a continuous stream from a source of supply to each mixer means, (c) a plurality of individual concentrated cleaning agent supplying means, each being adapted to supply its agent in a continuous stream from its supply source to at least one of said mixer means for said agent, (d) temperature measuring means for continuously determining the temperature of the exterior surface of a car about to enter said system, (e) temperature transmitter means associated with said temperature measuring means and continuously responsive to a signal from said temperature measuring means, (f) flow control means associated with said temperature transmitter means continuously responsive thereto for regulating the flows of said concentrated cleaning agents to said individual mixer means, (g) and a plurality of delivery means for diluted cleaner solutions, each means being adapted to deliver a cleaning agent to its respective spray station, said temperature measuring means, controller means and flow control means cooperating to continuously measure said surface temperature and thereby to automatically determine the amounts of each individual concentrated cleaning agent to mix wtih the water to form said individual diluted cleaner solutions and when said temperature changes to a new temperature to automatically and simultaneously change the concentration of cleaning agent in each solution by automatically changing the amount of concentrated cleaning agent being added to a new predetermined amount.

16. The apparatus according to claim 16 wherein the flow control means for a liquid concentrated cleaning agent comprises a variable speed motor and a proportioning pump.

17. The apparatus according to claim 16 wherein the flow control means for a liquid concentrated cleaning agent comprises an automatically variable control valve.

References Cited by the Examiner
UNITED STATES PATENTS

| | | | |
|---|---|---|---|
| 2,065,128 | 12/1936 | Eisinger | 222—54 X |
| 2,830,311 | 4/1958 | Vizdos | 134—57 X |

ROBERT B. REEVES, *Primary Examiner.*

H. S. LANE, *Assistant Examiner.*